(12) United States Patent
Stanley et al.

(10) Patent No.: US 9,240,693 B2
(45) Date of Patent: Jan. 19, 2016

(54) BATTERY DISCHARGE DEVICE WITH SELF-ADJUSTING RESISTANCE

(71) Applicant: FORD GLOBAL TECHNOLOGIES, LLC, Dearborn, MI (US)

(72) Inventors: Joel Ray Stanley, Dryden, MI (US); Philip Michael Gonzales, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 99 days.

(21) Appl. No.: 14/097,364

(22) Filed: Dec. 5, 2013

(65) Prior Publication Data

US 2015/0162761 A1    Jun. 11, 2015

(51) Int. Cl.
*H02P 1/00* (2006.01)
*H02J 7/00* (2006.01)
*H02P 31/00* (2006.01)

(52) U.S. Cl.
CPC ............... *H02J 7/0029* (2013.01); *H02P 31/00* (2013.01)

(58) Field of Classification Search
CPC ..... H02J 7/0055; H02J 7/0068; H02J 7/0026; H02J 7/1423; B60L 11/1861; B60L 11/1887
See application file for complete search history.

(56) References Cited

U.S. PATENT DOCUMENTS

| | | | |
|---|---|---|---|
| 6,107,777 | A | 8/2000 | Garde et al. |
| 2010/0261048 | A1 | 10/2010 | Kim et al. |
| 2012/0062029 | A1 | 3/2012 | Fukuyama et al. |
| 2013/0207613 | A1 | 8/2013 | Loncarevic |
| 2013/0207619 | A1 | 8/2013 | Viancino et al. |
| 2013/0214745 | A1 | 8/2013 | Funaba et al. |
| 2015/0117075 | A1* | 4/2015 | Matsumoto .................. 363/126 |

FOREIGN PATENT DOCUMENTS

CN   201629594 U   11/2010
WO   2012163504 A2   12/2012

* cited by examiner

*Primary Examiner* — Karen Masih
(74) *Attorney, Agent, or Firm* — Carlson, Gaskey & Olds

(57) ABSTRACT

A battery discharge device according to an exemplary aspect of the present disclosure includes, among other things, a sensor configured to sense a parameter of a high voltage source, a controller in communication with the sensor and a discharge circuit that discharges energy stored on the high voltage source in response to a command signal from the controller. The discharge circuit includes a plurality of resistors connected in parallel to one another.

22 Claims, 3 Drawing Sheets

BATTERY DISCHARGE DEVICE WITH SELF-ADJUSTING RESISTANCE

TECHNICAL FIELD

This disclosure relates to electrified vehicles, and more particularly, but not exclusively, to a battery discharge device for discharging energy stored on a high voltage source of an electrified vehicle subsequent to an abnormality event.

BACKGROUND

Hybrid electric vehicles (HEV's), plug-in hybrid electric vehicles (PHEV's), battery electric vehicles (BEV's), fuel cell vehicles and other known electrified vehicles differ from conventional motor vehicles in that they are powered by one or more electric machines (i.e., electric motors and/or generators) instead of or in addition to an internal combustion engine. High voltage current for powering these types of electric machine(s) is typically supplied by a traction battery system having one or more battery cells that store energy.

One or more battery cells of the traction battery system may become damaged during an abnormality event, such as a vehicle collision. It may be desirable to recycle the damaged battery cells after such an event. However, the energy stored within the battery cells may need dissipating to render the cells inert (i.e., a zero voltage state) prior to their removal from the electrified vehicle.

SUMMARY

A battery discharge device according to an exemplary aspect of the present disclosure includes, among other things, a sensor configured to sense a parameter of a high voltage source, a controller in communication with the sensor and a discharge circuit that discharges energy stored on the high voltage source in response to a command signal from the controller. The discharge circuit includes a plurality of resistors connected in parallel to one another.

In a further non-limiting embodiment of the foregoing battery discharge device, the sensor is a voltage sensor.

In a further non-limiting embodiment of either of the battery discharge devices, the sensor is a current sensor.

In a further non-limiting embodiment of any of the battery discharge devices, the sensor is a combined voltage and current sensor.

In a further non-limiting embodiment of any of the battery discharge devices, a contactor is between the discharge circuit and the high voltage source.

In a further non-limiting embodiment of any of the battery discharge devices, the contactor includes a switch that is actuable between a first position that closes a connection between the high voltage source and the discharge circuit and a second position that opens the connection.

In a further non-limiting embodiment of any of the battery discharge devices, the controller is powered by a battery separate from the high voltage source.

In a further non-limiting embodiment of any of the battery discharge devices, a wiring system electrically connects the sensor to the controller.

In a further non-limiting embodiment of any of the battery discharge devices, a switching device is connected in series with each of the plurality of resistors.

In a further non-limiting embodiment of any of the battery discharge devices, the controller is configured to actuate at least the switching device in order to switch additional resistors of the plurality of resistors into operation within the discharge circuit.

An electrified vehicle according to another exemplary aspect of the present disclosure includes, among other things, a battery, a high voltage source that powers an electric machine and a battery discharge device powered by the battery and configured to discharge energy stored on the high voltage source.

In a further non-limiting embodiment of the foregoing electrified vehicle, the high voltage source is a traction battery system of the electrified vehicle.

In a further non-limiting embodiment of either of the foregoing electrified vehicles, the battery is located on-board the electrified vehicle.

In a further non-limiting embodiment of any of the foregoing electrified vehicles, the battery discharge device includes a plurality of resistors connected in parallel to one another and each of the plurality of resistors is connected in series with a switch.

In a further non-limiting embodiment of any of the foregoing electrified vehicles, the battery discharge device is a stand-alone unit that is separate from the electrified vehicle.

A method according to another exemplary aspect of the present disclosure includes, among other things, connecting a battery discharge device to a high voltage source of an electrified vehicle, powering the battery discharge device with a battery located on-board the electrified vehicle and discharging energy stored on the high voltage source with the battery discharge device.

In a further non-limiting embodiment of the foregoing method, the step of connecting includes electrically connecting the battery discharge device to the high voltage source subsequent to a vehicle collision.

In a further non-limiting embodiment of either of the foregoing methods, the method includes the step of sensing a parameter associated with the high voltage source prior to the step of discharging.

In a further non-limiting embodiment of any of the foregoing methods, the step of discharging includes actuating a first switching device to discharge the energy into a first resistor of the battery discharge device.

In a further non-limiting embodiment of any of the foregoing methods, the method includes the step of actuating at least a second switch to add parallel resistances into the discharge circuit.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery discharge device for discharging energy stored on a high voltage source of an electrified vehicle. The battery discharge device is a stand-alone unit separate from, and connectable to, the electrified vehicle. The battery discharge device may include a sensor that senses a parameter associated with the high voltage source and a controller that monitors the sensed parameters. Based on the sensed parameters, the controller can command operation of discharge circuit. The discharge includes a plurality of parallel resistors that can be selectively switched into the circuit to add parallel resistances in order to discharge energy stored on the high voltage source. These and other features are discussed in greater detail herein.

Figure 1:
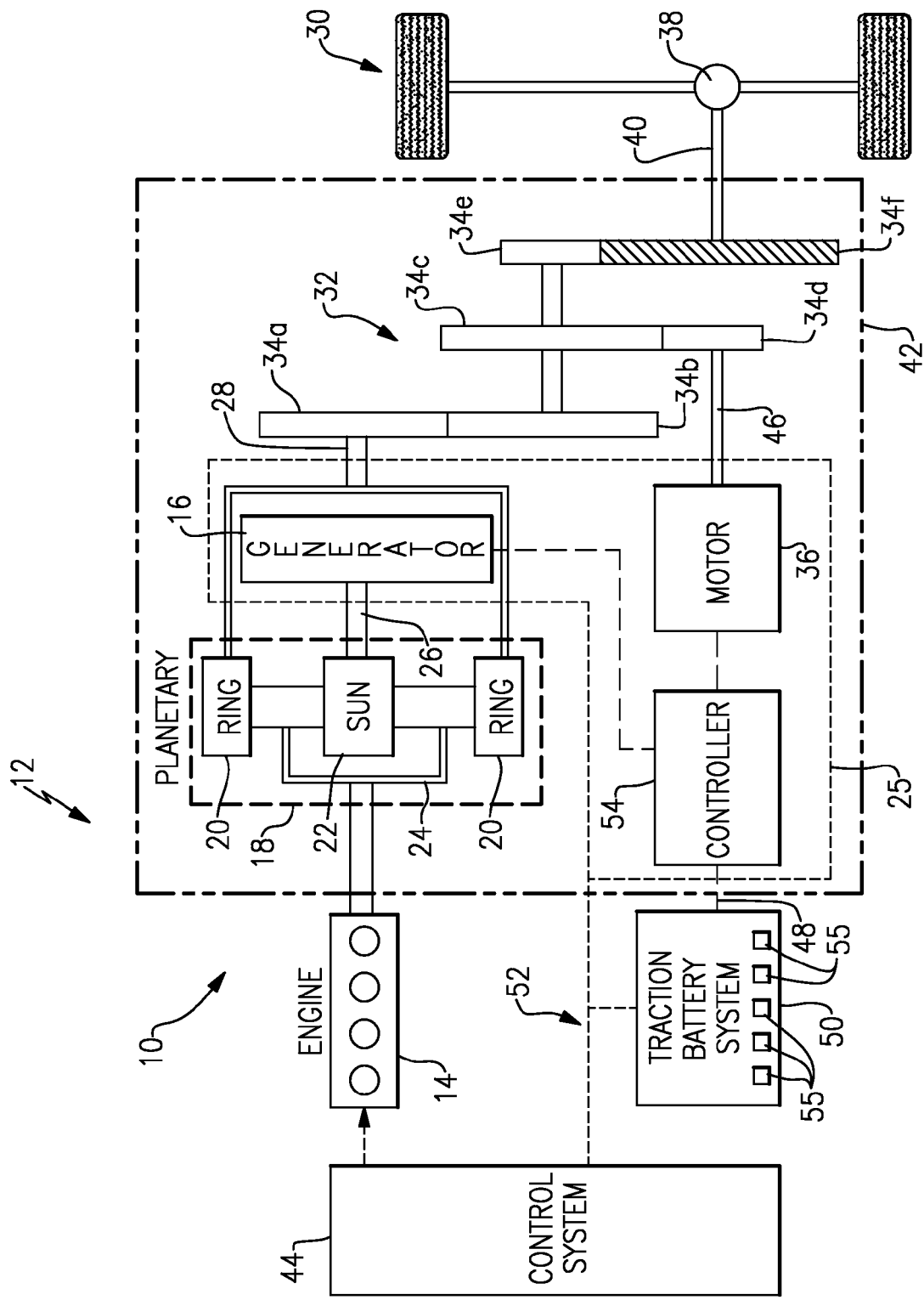
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a powersplit system that employs a first drive system that includes a combination of an engine 14 and a generator 16 (i.e., a first electric machine) and a second drive system that includes at least a motor 36 (i.e., a second electric machine), the generator 16 and a traction battery system 50. For example, the motor 36, the generator 16 and the traction battery system 50 may make up an electric drive system 25 of the powertrain 10. The first and second drive systems generate torque to drive one or more sets of vehicle drive wheels 30 of the electrified vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16. In another embodiment, the engine 14 acts as a generator and the motor 36 drives the vehicle drive wheels 30.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the traction battery system 50. The traction battery system 50 may be a high voltage battery that is capable of outputting electrical power to operate the motor 36 and the generator 16. Other types of energy storage devices and/or output devices can also be incorporated for use with the electrified vehicle 12. The traction battery system 50 may include one or more battery cells 55 that store the energy necessary to power the motor 36 and/or generator 16.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the traction battery system 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
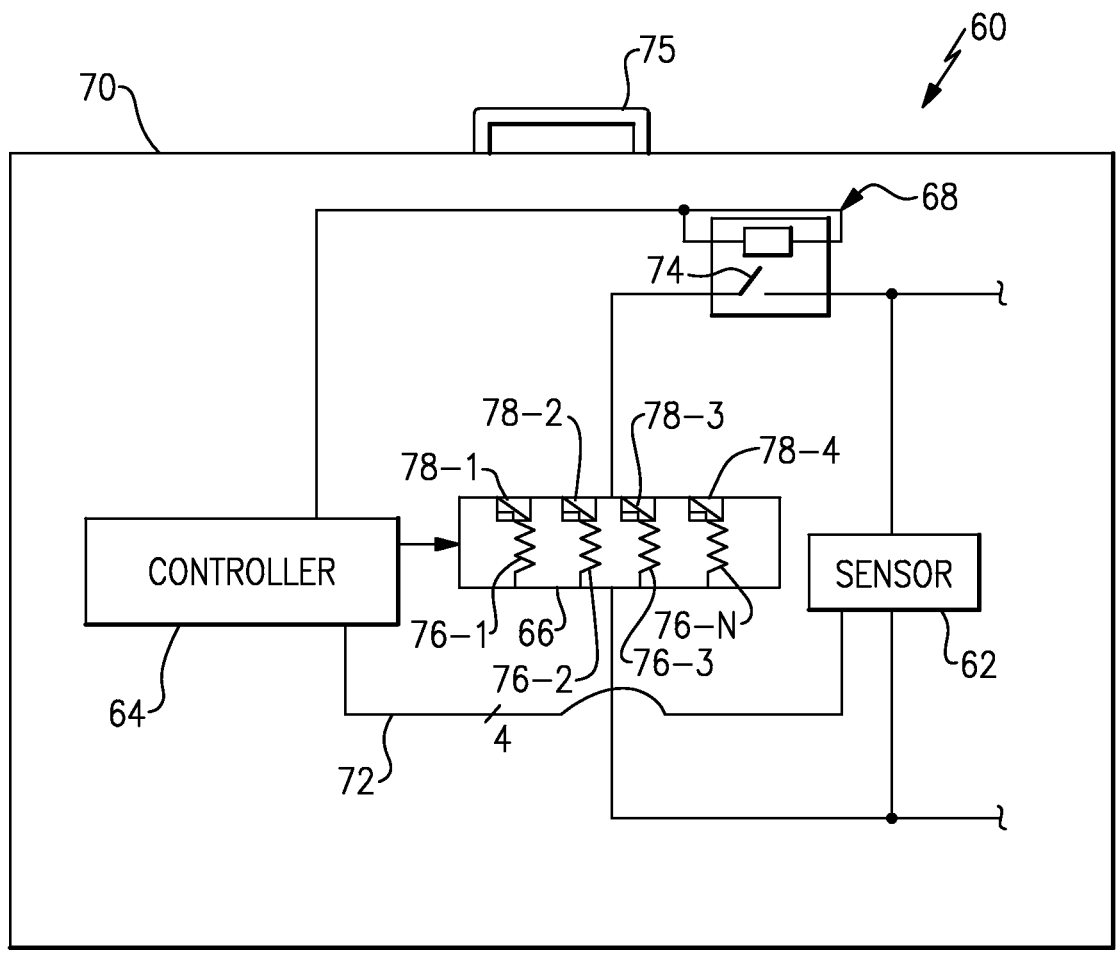
FIG. 2 illustrates a battery discharge device.

FIG. 2 illustrates a battery discharge device 60 that may be employed to dissipate the energy stored on a high voltage source subsequent to an abnormality event. For example, in one non-limiting embodiment, one or more internal components (battery case, tray, controller, sensing wiring, array etc.) of the traction battery system 50 (see FIG. 1) may be damaged in response to a vehicle collision. The battery discharge device 60 could be used to render the traction battery system 50 inert by dissipating the energy stored on the battery cells 55 to a zero voltage state or to any state of charge (SOC) less than a current SOC. It should be understood that other high voltage sources may be discharged by the battery discharge device 60 within the scope of this disclosure.

In one embodiment, the battery discharge device 60 is a stand-alone unit that is separate from, and connectable to, the electrified vehicle 12. In other words, the battery discharge device 60 is transportable and can be carried by a user in a relatively simple manner.

In one embodiment, the battery discharge device 60 includes a sensor 62, a controller 64, a discharge circuit 66, and a contactor 68. Each of the sensor 62, the controller 64, the discharge circuit 66 and the contactor 68 may be housed within a housing 70. The housing 70 may include a handle 75 for transporting the battery discharge device 60 to the location of a high voltage source in need of energy dissipation. The housing 70 is depicted in a highly schematic manner in FIG. 2, and its size, shape and general configuration are not intended to limit this disclosure.

In one embodiment, the sensor 62 is a voltage sensor. In another embodiment, the sensor 62 is a current sensor. In yet another embodiment, the sensor 62 is a combined voltage and current sensor. The sensor 62 may sense one or more parameters (i.e., voltage, current, etc.) associated with a high voltage source, such as the traction battery system 50 of FIG. 1. This information may be communicated to the controller 64 via a wiring system 72. In one embodiment, the wiring system 72 includes four wires that electrically connect the controller 64 and the sensor 62, although other configurations are also contemplated.

In one embodiment, the controller 64 is a microprocessor based controller that includes the necessary hardware and software for monitoring feedback from the sensor 62. The controller 64 may also communicate with, and control operation of, the contactor 68 and the discharge circuit 66, as discussed in greater detail below with respect to FIG. 3.

Figure 3:
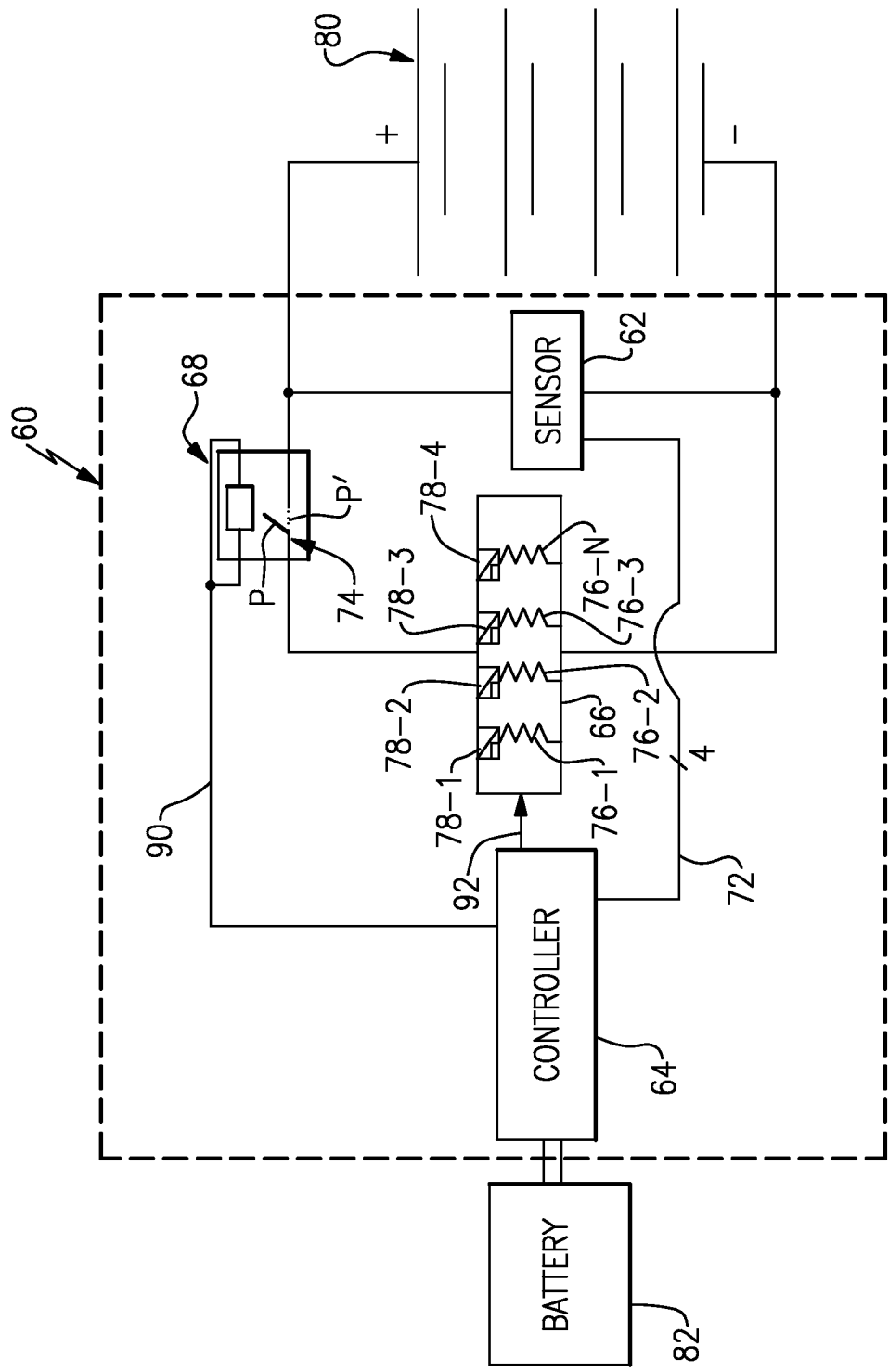
FIG. 3 schematically illustrates a method of discharging energy stored on a high voltage source of an electrified vehicle.

The contactor 68 includes at least one switch 74 for selectively opening and closing a connection between the discharge circuit 66 and a high voltage source (shown in FIG. 3). In other words, the contactor 68 is positioned between the discharge circuit 66 and a high voltage source and may couple or decouple the battery discharge device 60 to/from the high voltage source. When the switch 74 is closed, the contactor 68 couples the discharge circuit 66 to a high voltage source in order to discharge the high voltage source. In contrast, when opened, the contactor 68 decouples the battery discharge device 60 from the high voltage source.

The discharge circuit 66 acts as a load for depleting the energy stored in the high voltage source. For example, the discharge circuit 66 may include a plurality of resistors 76-1, 76-2, 76-3 and 76-N. The number of resistors N could vary and is not intended to limit this disclosure. In one non-limiting embodiment, the resistors 76-1, 76-2, 76-3 and 76-N are positioned in parallel to one another. Each resistor 76-1, 76-2, 76-3 and 76-N may be connected in series with a switching device 78-1, 78-2, 78-3 and 78-N, respectively. The switching devices 78-1, 78-2, 78-3 and 78-N may be switches or relays, as non-limiting embodiments. In one embodiment, the discharge circuit 66 is sensitive to the voltage of the high voltage source under discharge. As discussed in greater detail relative to FIG. 3, additional resistors 76-2, 76-3 to 76-N may be switched into operation in order to reduce the amount of time necessary to dissipate the energy stored on the high voltage source.

FIG. 3 schematically illustrates a method of utilizing the battery discharge device 60 to discharge energy stored on a high voltage source 80. The method may be performed in response to an abnormality event associated with the electrified vehicle 12. In one embodiment, the abnormality event is a vehicle collision that damages the high voltage source 80 in some way. In another embodiment, the abnormality event is an isolation fault. However, other events may also trigger the necessity to dissipate the energy stored on the high voltage source 80. It should be understood that the discharging process described herein could include additional steps and that the steps could be performed in a different order than is specifically described below.

The battery discharge device 60 may be connected to the high voltage source 80 at a point in time subsequent to the abnormality event. The battery discharge device 60 may be connected to the high voltage source 80 in any known manner. In one non-limiting embodiment, a standard electrical clip (not shown) can be used to connect the battery discharge device 60 to both a positive (+) and a negative (−) side of the high voltage source 80. The electrical clip could be a spring clip, alligator clip or any other device for electrically connecting two components.

The battery discharge device 60 may be connected to and powered by a battery 82. This connection can be achieved in any known manner and could be either similar or dissimilar to the connecting methodology used to connect the battery discharge device 60 to the high voltage source 80. In one non-limiting embodiment, the battery 82 is a 12V battery located on-board of the same electrified vehicle powered by the high voltage source 80. The battery 82 is a separate power source from the high voltage source 80, in one embodiment.

After completing the various connections required to operate the battery discharge device 60, the sensor 62 of the battery discharge device 60 may sense a parameter associated with the high voltage source 80. In one embodiment, the sensed parameter includes voltage readings of the high voltage source 80. In another embodiment, the sensed parameter includes current readings of the high voltage source 80. In yet another embodiment, the sensed parameter includes voltage and current readings of the high voltage source 80.

The sensor 62 may communicate with the controller 64 over the wiring system 72. For example, the sensor 62 can communicate information related to the sensed parameters to the controller 64. The controller 64 uses internal logic to analyze the sensed parameters in order to determine when and how to operate the contactor 68 and the discharge circuit 66.

The controller 64 commands the contactor 68 closed to begin the discharge process. For example, the controller 64 may communicate a signal over path 90 to the contactor 68 commanding actuation of the switch 74 from an open position P to a closed position P'. Closing the switch 74 in this manner couples the discharge circuit 66 to the high voltage source 80 so that the dissipation process may commence.

Energy from the high voltage source 80 is dissipated into the resistors 76-1, 76-2, 76-3 and 76-N of the discharge circuit 66. In one non-limiting process, the first switching device 78-1 is actuated to begin dissipating energy into the first resistor 76-1. Because the discharge process follows Ohm's Law (i.e., V=IR), the dissipation decelerates as the amount of energy remaining decreases. Therefore, as the energy stored on the high voltage source 80 falls, the second resistor 76-2 may be switched into operation in parallel to the first resistor 76-1 by actuating the switching device 78-2 in order to accelerate the discharge process. Two identical resistances in parallel will have an overall resistance that is half that of either of the original resistors alone. By reducing the resistance in this manner, the current increases, thereby reducing the amount of time necessary to discharge the high voltage source 80 to a zero voltage state. Additional resistors 76-3 to 76-N may be switched into the discharge circuit 66 in parallel to the first resistor 76-1 and the second resistor 76-2 by actuating the switching devices 78-3 to 78-N to further accelerate the discharge process.

The decision to switch additional resistances into operation is made by the controller 64. In one embodiment, the controller 64 switches additional resistances 76-2 to 76-N into operation based on the feedback it receives from the sensor 62. The controller 64 may communicate a command signal 92 that includes instructions for operating the switching devices 78 and resistors 76 of the discharge circuit 66 for a particular discharge process. The controller 64 may monitor various information for determining when to switch in the additional resistors 76, including but not limited to, a temperature of the resistors 76, the time at each voltage step, time at current level, maximum current rating of the resistors 76, maximum current rating of system wiring, low voltage signals from the battery 82, and temperature of the housing 70.

Accordingly, the battery discharge device 60 provides a self-adjusting resistance system that is capable of maintaining a discharge current through the resistor network. In this way, different high voltage source designs can be discharged through the same battery discharge device 60.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery discharge device, comprising:
   a sensor configured to sense a parameter of a high voltage source;
   a controller in communication with said sensor; and
   a discharge circuit that discharges energy stored on said high voltage source in response to a command signal from said controller, wherein said discharge circuit includes a plurality of resistors connected in parallel to one another.

2. The battery discharge device as recited in claim 1, wherein said sensor is a voltage sensor.

3. The battery discharge device as recited in claim 1, wherein said sensor is a current sensor.

4. The battery discharge device as recited in claim 1, wherein said sensor is a combined voltage and current sensor.

5. The battery discharge device as recited in claim 1, comprising a contactor between said discharge circuit and said high voltage source.

6. The battery discharge device as recited in claim 5, wherein said contactor includes a switch that is actuable between a first position that closes a connection between said high voltage source and said discharge circuit and a second position that opens said connection.

7. The battery discharge device as recited in claim 1, wherein said controller is powered by a battery separate from said high voltage source.

8. The battery discharge device as recited in claim 1, comprising a wiring system that electrically connects said sensor to said controller.

9. The battery discharge device as recited in claim 1, comprising a switching device connected in series with each of said plurality of resistors.

10. The battery discharge device as recited in claim 9, wherein said controller is configured to actuate at least said switching device in order to switch additional resistors of said plurality of resistors into operation within said discharge circuit.

11. An electrified vehicle, comprising:
    a battery;
    a high voltage source that powers an electric machine; and
    a battery discharge device powered by said battery and configured to discharge energy stored on said high voltage source, and the battery discharge device is a transportable unit separate from said electrified vehicle.

12. The electrified vehicle as recited in claim 11, wherein said high voltage source is a traction battery system of said electrified vehicle.

13. The electrified vehicle as recited in claim 11, wherein said battery is located on-board said electrified vehicle.

14. The electrified vehicle as recited in claim 11, wherein said battery discharge device includes a plurality of resistors connected in parallel to one another and each of said plurality of resistors is connected in series with a switch.

15. A method, comprising:
    connecting a battery discharge device to a high voltage source of an electrified vehicle, and the battery discharge device is a transportable unit separate from the electrified vehicle;
    powering the battery discharge device with a battery located on-board the electrified vehicle; and
    discharging energy stored on the high voltage source with the battery discharge device.

16. The method as recited in claim 15, wherein the step of connecting includes electrically connecting the battery discharge device to the high voltage source subsequent to a vehicle collision.

17. The method as recited in claim 15, comprising the step of sensing a parameter associated with the high voltage source prior to the step of discharging.

18. The method as recited in claim 15, wherein the step of discharging includes actuating a first switching device to discharge the energy into a first resistor of the battery discharge device.

19. The method as recited in claim 18, comprising the step of actuating at least a second switch to add parallel resistances into the discharge circuit.

20. The battery discharge device as recited in claim 1, wherein each of said sensor, said controller and said discharge circuit are housed within a housing.

21. The battery discharge device as recited in claim 20, wherein said housing includes a handle configured for transporting the battery discharge device.

22. The battery discharge device as recited in claim 1, wherein said controller is configured to switch a second resistor of said plurality of resistors into operation in parallel to a first resistor of said plurality of resistors based on feedback from said sensor and in response to a vehicle abnormality event.

* * * * *